(12) United States Patent
Nishimura

(10) Patent No.: US 10,272,331 B2
(45) Date of Patent: Apr. 30, 2019

(54) SIMULATED EXPERIENCE DEVICE FOR VIDEO-GAME

(71) Applicant: Shinji Nishimura, Yokohama (JP)

(72) Inventor: Shinji Nishimura, Yokohama (JP)

(*) Notice: Subject to any disclaimer, the term of this patent is extended or adjusted under 35 U.S.C. 154(b) by 361 days.

(21) Appl. No.: 15/404,198

(22) Filed: Jan. 12, 2017

(65) Prior Publication Data

US 2017/0120146 A1 May 4, 2017

Related U.S. Application Data

(63) Continuation of application No. PCT/JP2014/071788, filed on Aug. 20, 2014.

(51) Int. Cl.
*A63F 13/24* (2014.01)
*A63F 13/285* (2014.01)
*A63F 13/218* (2014.01)
*A63F 13/98* (2014.01)

(52) U.S. Cl.
CPC .......... *A63F 13/285* (2014.09); *A63F 13/218* (2014.09); *A63F 13/24* (2014.09); *A63F 13/98* (2014.09)

(58) Field of Classification Search
CPC .......... A63F 13/20; A63F 13/21; A63F 13/24; A63F 9/24
See application file for complete search history.

(56) References Cited

U.S. PATENT DOCUMENTS

| | | | |
|---|---|---|---|
| 5,883,690 A * | 3/1999 | Meyers | A63F 13/02 345/157 |
| 5,976,018 A * | 11/1999 | Druckman | A63F 13/08 273/148 B |
| 6,589,118 B1 * | 7/2003 | Soma | A63F 13/06 463/37 |
| 6,773,325 B1 * | 8/2004 | Mawle | A63F 13/02 446/175 |
| 6,811,491 B1 * | 11/2004 | Levenberg | A63F 13/02 273/148 B |

(Continued)

OTHER PUBLICATIONS

International Search Report for PCT/JP2014/071788 dated Oct. 7, 2014.
PCT written opinion dated Oct. 7, 2014.

*Primary Examiner* — James S. McClellan
(74) *Attorney, Agent, or Firm* — Yokoi & Co., U.S.A.; Toshiyuki Yokoi

(57) ABSTRACT

The present invention provides an idea to achieve a simulated experience device for video-game enabling a simulated experience for an operator to bodily feel a tactile sense corresponding to a video-game software and give a reaction by a force of the operator. By combining a doll play using a figurine, a tool and a mechanical device for creating the tactile sense corresponding to the content of the video-game and a sensory video-game operated by using human body, the tactile sense corresponding to the content of the video-game is created, the created tactile sense is felt by the operator, a reaction is given to the tactile sense felt by the operator while adjusting a force of the operator. Thus, a load is generated and the generated load is quantified as X, converting X into a button operation of a remote controller for the video-game. Accordingly, a simulated experience device for enabling the simulated experience of the tactile sense of the video-game is achieved.

4 Claims, 6 Drawing Sheets

(56) References Cited

U.S. PATENT DOCUMENTS

| | | | | |
|---|---|---|---|---|
| 9,457,281 | B1* | 10/2016 | Lam | A63H 33/00 |
| 2004/0188933 | A1* | 9/2004 | Siciliano | A63F 13/02 |
| | | | | 273/148 B |
| 2008/0153594 | A1* | 6/2008 | Zheng | A63H 3/28 |
| | | | | 463/39 |
| 2008/0174550 | A1* | 7/2008 | Laurila | A63F 13/02 |
| | | | | 345/158 |

* cited by examiner

\* Calculation formula of the load is show below.
   Load = (estimated power consumption/estimated power consumption-1)×100 = X%

\* Method for converting X into the button operation can be freely set depending on the kind of the computer game soft.

SIMULATED EXPERIENCE DEVICE FOR VIDEO-GAME

CROSS-REFERENCES TO RELATED APPLICATIONS

This Application claims the benefit of priority and is a Continuation application of the prior International Patent Application No. PCT/JP2014/071788, with an international filing date of Aug. 20, 2014, which designated the United States, the entire disclosures of all applications are expressly incorporated by reference in their entirety herein.

BACKGROUND OF THE INVENTION

1. Field of the Invention

The present invention relates to a video-game combining a doll play using a figurine and a sensory game operated by a tool, a mechanical device and human body so that a virtual (simulated) tactile sense is created corresponding to the content of a video-game, the created tactile sense is bodily felt by a human operator, and a load generated by giving a reaction to a force of the tactile sense can be quantified. Thus, the present invention is an idea of the video-game enabling a simulated experience of the tactile sense.

2. Description of Related Art

In the conventional video-game, operations are made by buttons of a remote controller corresponding to a video-game machine.

BRIEF SUMMARY OF THE INVENTION

There are various kinds of video-game software and the remote controller is prepared to correspond to each video-game machine so that the video-game is played by a button operation of the remote controller. The button of the remote controller for the video-game is a general term of buttons used in the remote controller for the video-game. For example, the button can be push buttons, touch buttons, lever buttons and dial buttons.

However, the simulated experience of the tactile sense corresponding to the content of the video-game cannot be experienced by normal buttons of the remote controller for the video-game.

Although sensory video-games to make the operator operate the video-games using the human body were conventionally existed, it was impossible to reply a reaction by a force of the operator to the force of the tactile sense received by the operator corresponding to the content of the video-game so that the reaction is reflected to the video-game.

In the present invention, instead of the operation of the button portion of the remote controller for the video-game, the mechanical device and the tool provided with the figurine are operated. The operator operates the figurine while it is held by hands, feels the tactile sense corresponding to the video-game from the figurine, and gives a reaction to generate a load while adjusting a force of the operator. Thus, the generated load is reflected to the game. Consequently, the simulated experience of the tactile sense corresponding to the content of the video-game can be experienced.

The virtual tactile sense is created to match the content of the video-game by the tool and mechanical device, the created virtual tactile sense is bodily felt by the human, and the reaction is given to the force of the felt tactile sense while the force is adjusted by the human (operator). Thus, the load is generated. The generated load is quantified, converted into the operation of the button portion of the remote controller for the video-game, and transmitted to the remote controller for the video-game as a signal. Thus, the video-game enabling a simulated experience of the tactile sense can be achieved.

In the present invention, the button portion of the remote controller for the video-game is replaced with the tool and the mechanical device which can create the tactile sense corresponding to the content of the video-game, make the operator bodily feel the created tactile sense and give the reaction. In addition, the doll play using the figurine is combined with the sensory video-game operated by using the human body. Thus, the video-game enabling the simulated experience of the tactile sense is achieved. The present invention provides an idea enabling the simulated experience of the tactile sense corresponding to the content of the video-game by bodily feeling the tactile sense corresponding to the content of the video-game and giving the reaction to the force of the felt tactile sense while adjusting the force by the human.

A specific method for solving the above described problem will be explained below using a video-game software of a maze video-game.

If the maze video-game is applied to FIG. 6, the tactile sense corresponding to the content of the video-game such as movement and impact when game characters are moved forward, backward, right, left, obliquely, upward and downward in the maze is created by the tool and the mechanical device. While the operator bodily feels the created tactile sense, the operator gives an operation to the force felt by the operator while adjusting the force by the operator The load generated here is quantified and converted into the operation of the button portion of the remote controller for the video-game, and transfers to the remote controller for the video-game as a signal.

In the present invention, as shown in FIG. 1, a circular table-type sensory device 4 having a circular base for placing the figurine is provided. As shown in FIG. 2 and FIG. 3, the circular table-type sensory device 4 includes a large movable ring 12 having a completely round shape to be rotated along an inner periphery surface of a body 7, a first motor 13 to drive the large movable ring 12, a small movable ring 11 to be moved in the large movable ring 12 along an arc passing through a center point of a circle of the large movable ring 12, a second motor 22 to drive the small movable ring 11, a circular table 3 to be moved forward, backward, right, left, obliquely, upward and downward, a rod 3a formed integrally with the circular table 3 to be inserted into the small movable ring 11 and moved upward and downward, a fourth motor 27 to drive the rod 3a, an impact device 9 shown in FIG. 5 to be attached to a lower part of the circular table 3, a third motor 26 to drive an elliptic plate 8, and a built-in computer device C to be attached to a bottom part of the circular table-type sensory device 4. The built-in computer device C receives a signal (video-game signal) about the movement of the game characters from a video-game device 5 and performs a first control that calculates estimated power consumptions for rotating (driving) the motors 13, 22, 26, 27 to match the content of the video-game, a second control that creates tactile sense of the movement of the game characters by the circular table-type sensory device 4 and the circular table 3 by rotating (driving) the motors 13, 22, 26, 27 corresponding to the content of the video-game and transmits the created tactile sense to a figurine la which is set to an adapter 2 locked to the circular table 3, and a third control that receives power consumptions of the motors 13, 22, 27, which receive a load from the operation of the figurine 1a set to the adapter 2, from wattmeters 13a, 22a, 27a, calculates and quantifies the load from the estimated power consumption and the power consumption, and converts the quantified load into a button operation of the remote controller for the video-game, gives a numeral "1" to an action of pressing a button and a numeral "0" to an action of not pressing the button or the numeral "0" to an action of pressing the button and the numeral "1" to the action of not pressing the button, and transmits a binary-quantified signal to a remote controller R.

As shown in FIG. 4, the adapter 2 has locks 2a. The locks 2a are locked to an upper part of the circular table 3 so that the adapter 2 is fixed to the circular table 3. The rod 3a is formed integrally with the circular table 3 to be moved freely upward and downward inside the small movable ring 11 within a range of an opening of the circular table-type sensory device 4. Until the end of the video-game, the built-in computer device C receives the signal of the movement of the game characters from the video-game device 5, and rotates the motors 13, 22, 26, 27 to drive the large movable ring 12, the small movable ring 11, the elliptic plate 8 and the circular table 3 interlockingly.

When the first and second motors are rotated, the small movable ring 11 is moved along an inner periphery surface of a rack 21, and the large movable ring 12 is rotated. Thus, the circular table 3 is moved forward, backward, right, left and obliquely. When the fourth motor 27 is rotated, the circular table 3 is moved upward and downward. When the third motor is rotated, the elliptic plate 8 is rotated to bounce an impact ball 24 upward and downward. Thus, the impact is transferred to the circular table 3.

When a player J operates the figurine 1a, the circular table 3 and the adapter 2 to which the figurine 1a is set are simultaneously moved. Thus, the motors 13, 22, 27 receive the load. The built-in computer device C receives the power consumptions from the wattmeters 13a, 22a, 27a. Then, the built-in computer device C calculates and quantifies the load from the estimated power consumption and the power consumption, converts the quantified load into a button operation of the remote controller for the video-game, gives a numeral "1" to an action of pressing a button and a numeral "0" to an action of not pressing the button or the numeral "0" to the action of pressing the button and the numeral "1" to the action of not pressing the button, and transmits the binary-quantified signal to the remote controller R. The remote controller R transmits a button operation signal to the video-game device 5.

Accordingly, in the present invention, the player J can bodily feel the tactile sense corresponding to the content of the video-game by using the adapter 2 to which the figurine 1a is set, the circular table 3 and the circular table-type sensory device 4, and play the video-game by adjusting a force of the player J with respect to the force of the tactile sense felt by the player J.

DETAILED DESCRIPTION OF THE INVENTION

As a prerequisite, the video-game device 5 transmits the signal of the video-game to a display device 6 and to a built-in computer device C simultaneously.

Hereafter, the embodiment of the present invention will be explained in detail with reference to the drawings.

Figure 1:
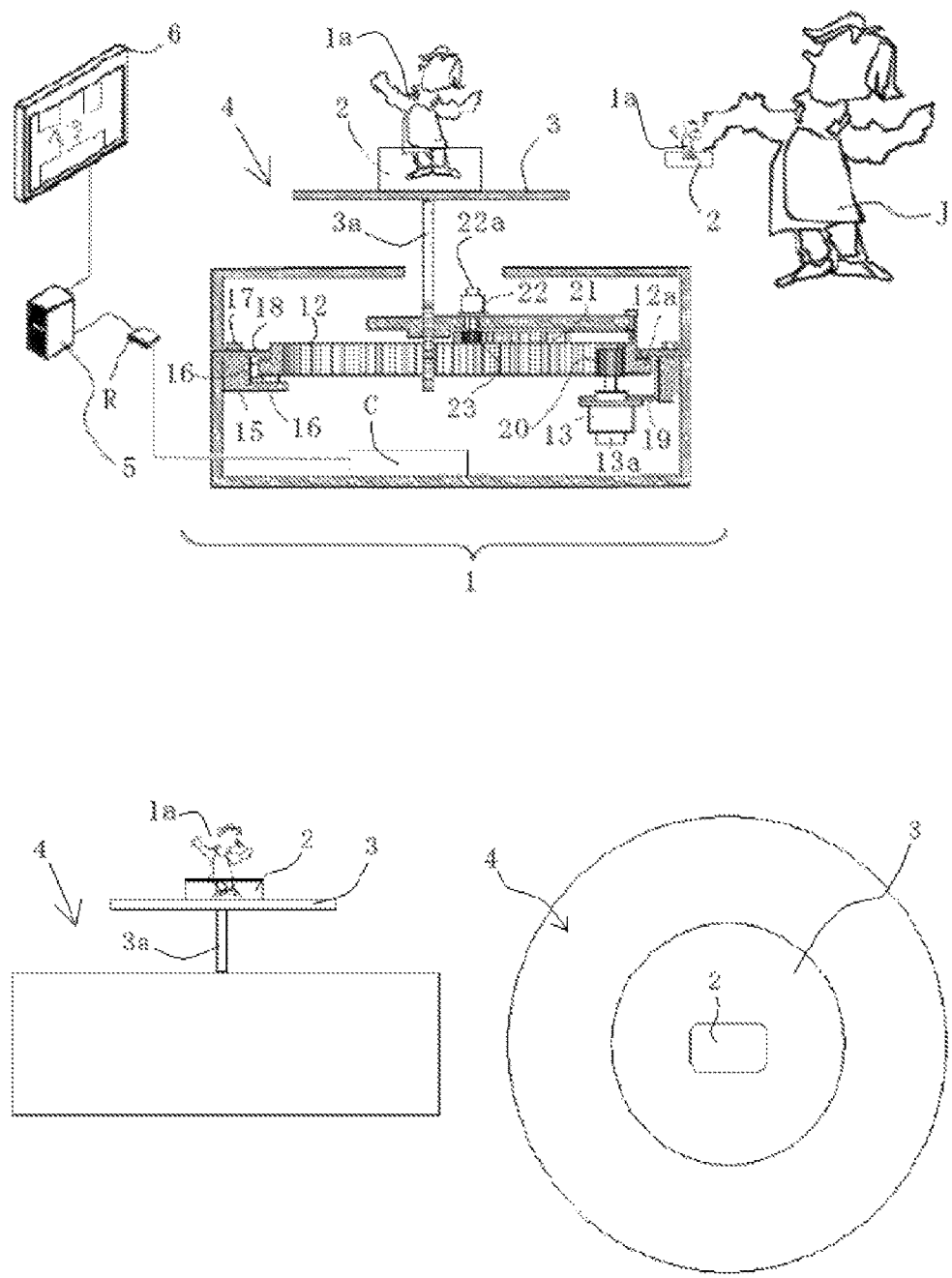
FIG. 1 is a system configuration diagram of one embodiment of the present invention.

FIG. 1 is a diagram showing an entire configuration of a video-game figurine sensory device 1 of an embodiment of the present invention.

Figure 6:
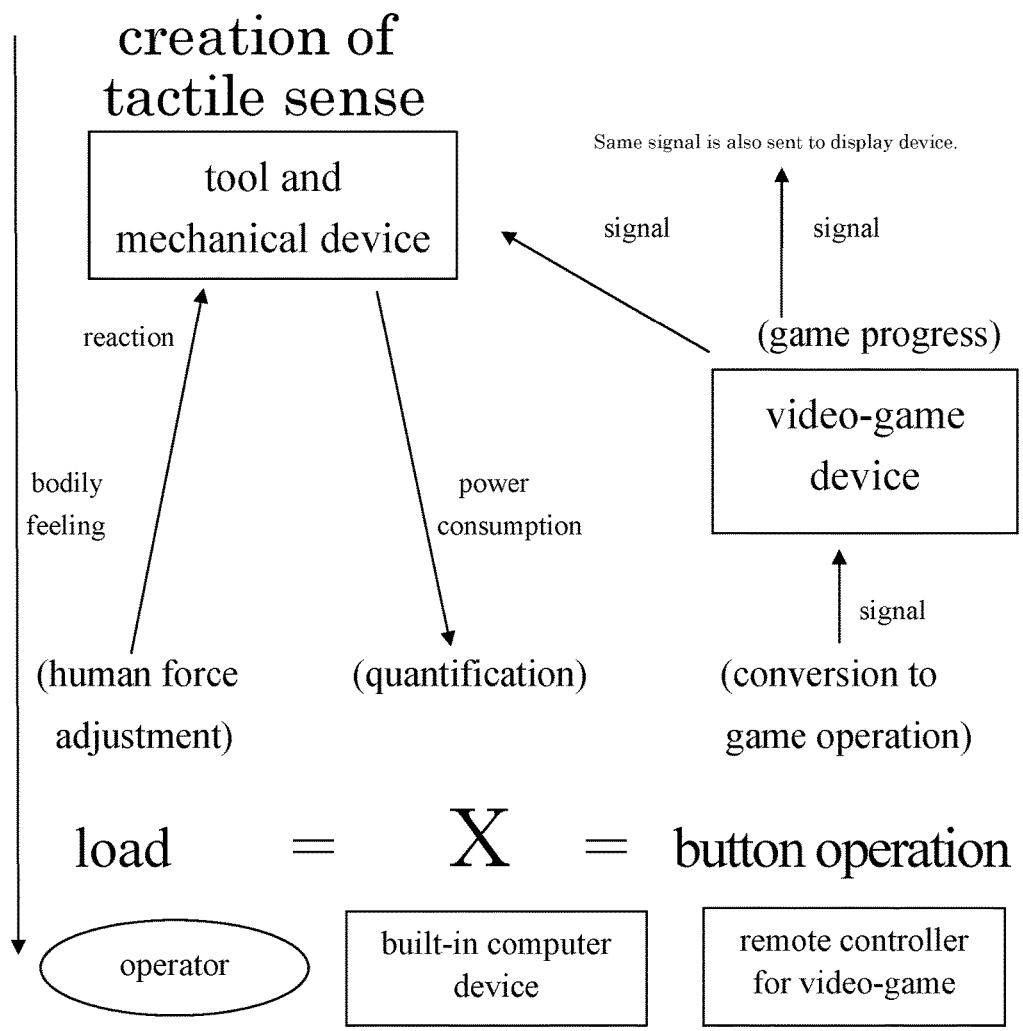
FIG. 6 is a conceptual diagram of the present invention.

As shown in FIG. 6, the signal of the video-game is transmitted from the video-game device 5 to the tool and the mechanical device, the built-in computer device C equipped with the tool and the mechanical device calculates the estimated power consumption based on the received signal, and a virtual tactile sense is created by rotating the motors 13, 22, 26, 27 to match the content of the video-game. The operator bodily feels the created tactile sense and operates the tool and the mechanical device by responding to the force of the tactile sense felt by the operator while adjusting the force by the human. While the motors 13, 22, 27 receive the load from the operation where the force is adjusted by the human, the power consumptions of the motors 13, 22, 27 are detected by the wattmeters 13a, 22a, 27a and transmitted to the built-in computer device C.

The built-in computer device C calculates and quantifies the load (the quantified load is referred to as "X") from the estimated power consumption and the power consumption of the motors 13, 22, 27, converts X into the button operation of the remote controller for the video-game, and transmits the signal of the button operation to the remote controller R.

A calculation formula of the load and a conversion example into the button operation are shown below.

Load=(power consumption/estimated power consumption−1)×100=X %

Pressing the button for one second: 5≥X>0, 0≥X>−5

Pressing the button for two seconds: 10≥X>5, −5≥X>−10

Pressing the button for three seconds: 20≥X>10, −10≥X>−20

Pressing the button for four seconds: 25≥X>20, −20≥X>−25

Pressing the button for five seconds: 30≥X>25, −25≥X>−30

Not pressing the button: X≥30, −30≥X

The above described six kinds of button operations are repeated every 5 seconds.

The above described six kinds of button operations are quantified into binary number by giving a numeral "1" to an action of pressing a button and a numeral "0" to an action of not pressing the button or the numeral "0" to the action of pressing the button and the numeral "1" to the action of not pressing the button.

*If an automobile is used as an example to explain the load, although an engine or a motor is rotated even in an upward slope or a downward slope, an energy efficiency varies depending on the situation. The inclination angle of the slope can be derived from the energy efficiency. The load is calculated by using a method like this.

The video-game figurine sensory device 1 makes the player J bodily feel the movement of the characters in the video-game as tactile sense, and makes the player J give a reaction to the force of the tactile sense felt by the player J. As shown in FIG. 1, the video-game figurine sensory device 1 is formed by a circular table-type sensory device 4, a circular table 3 and an adapter 2 to which a figurine 1a is set. The built-in computer device C is connected to the remote controller R and the video-game device 5. The video-game device 5 is connected to the display device 6.

The circular table-type sensory device 4 is formed in a cylindrical shape having a diameter of 30 cm and a height of 10 cm.

The circular table-type sensory device 4 has an opening at an upper part. A diameter of the opening is 10 cm. The circular table 3 is attached to the circular table-type sensory device 4.

The adapter 2 is detachably attached to an upper part of the circular table 3. An impact device 9 is attached to a lower part of the circular table 3. The rod 3a is formed integrally with the circular table 3 and housed in a small movable ring in a state that the rod 3a is movable. Teeth are formed at a lower part of the rod 3a.

Figure 2:
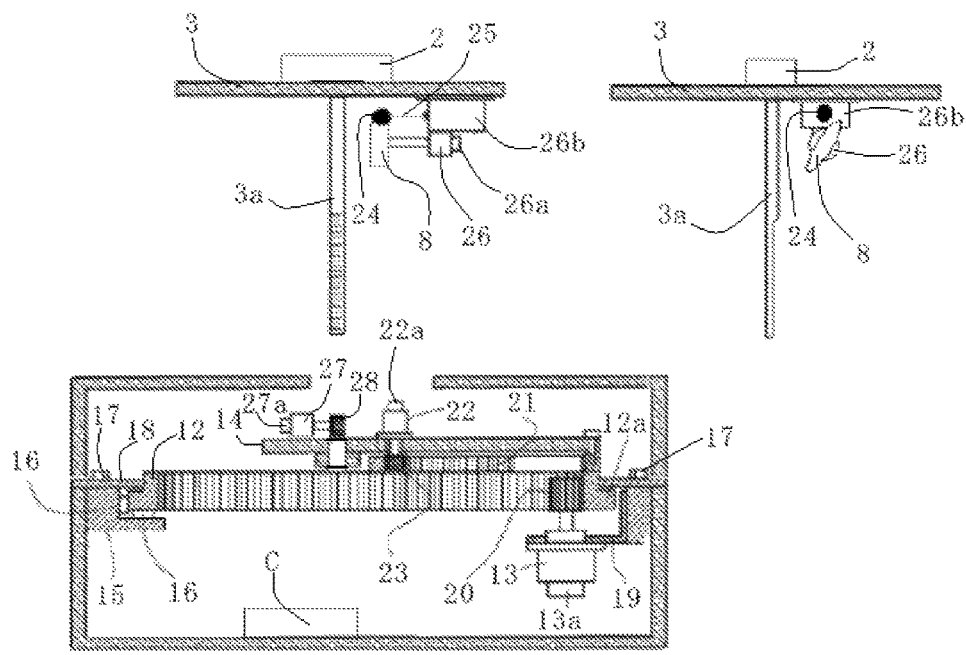
FIG. 2 is a vertical cross-section of a circular table-type sensory device 4 of one embodiment of the present invention.
Figure 2:
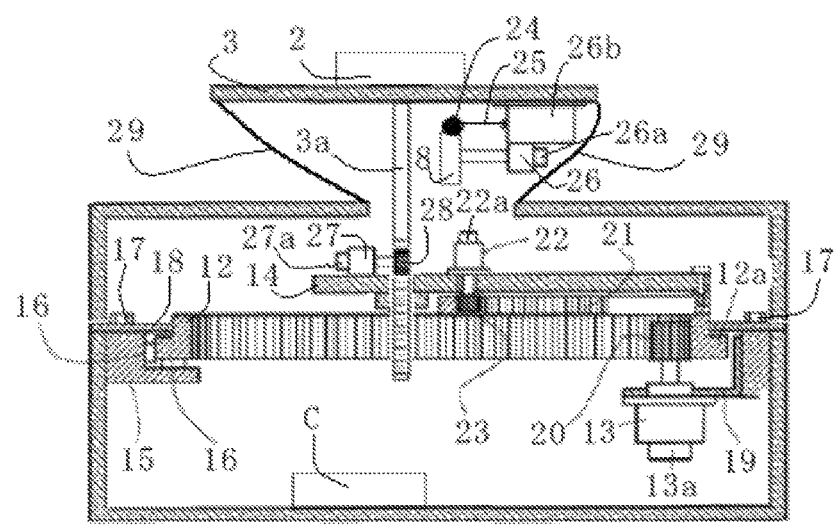

As shown in FIG. 2, inside of the circular table-type sensory device 4 can be divided into an upper layer where the circular table 3 is movable, a middle layer where the ring portion 10 is installed, and a lower layer where the built-in computer device C is installed.

The opening is formed at the upper layer of the circular table-type sensory device 4 so that the circular table 3 can be moved in all directions forward, backward, right, left, obliquely, upward and downward.

Figure 3:
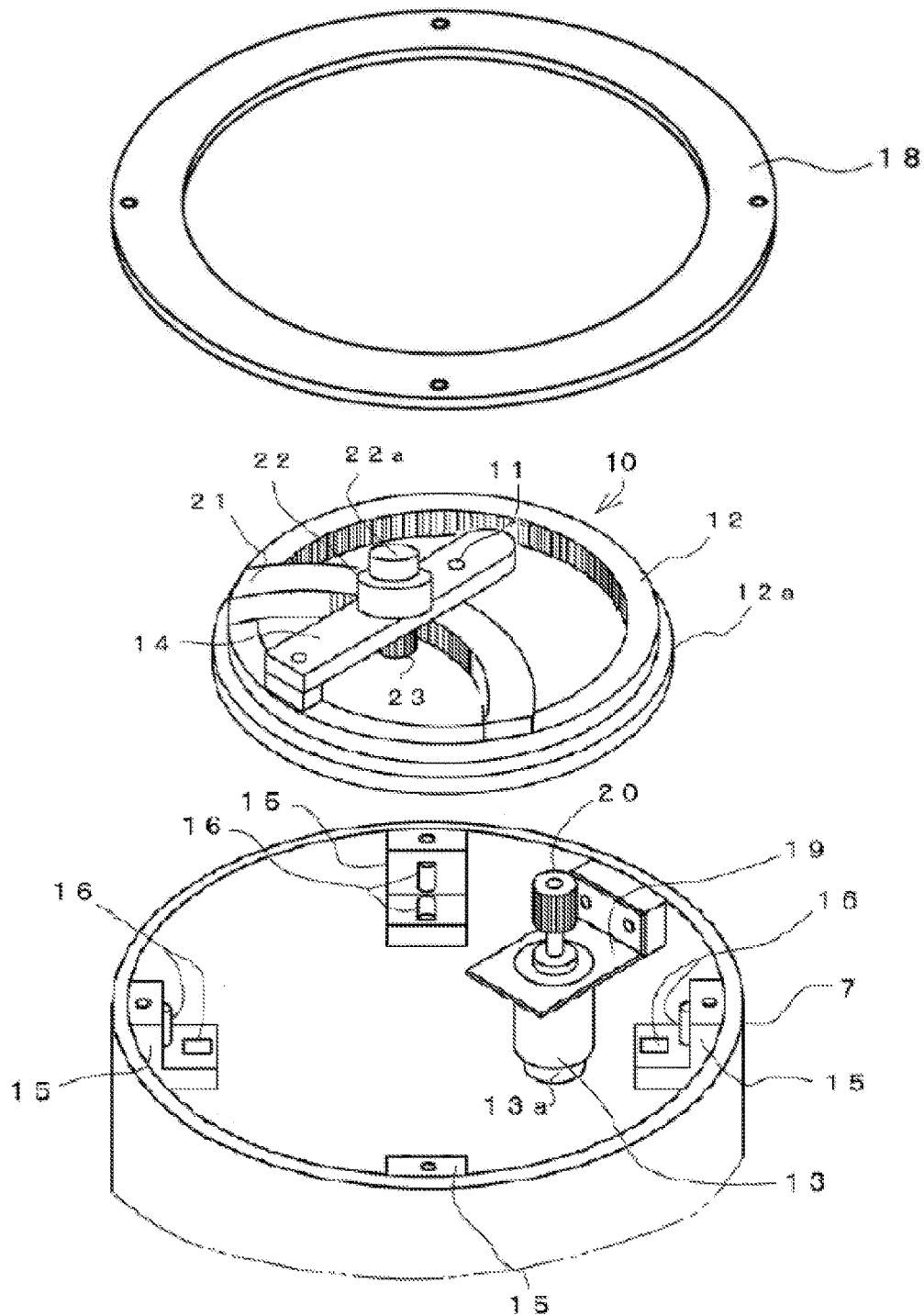
FIG. 3 is an exploded perspective view of a ring portion 10 of one embodiment of the present invention.
Figure 4:
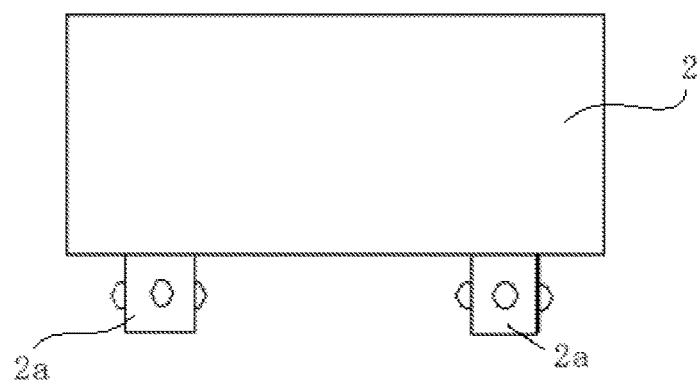
FIG. 4 is a vertical cross-section of an adapter 2 of one embodiment of the present invention.
Figure 4:
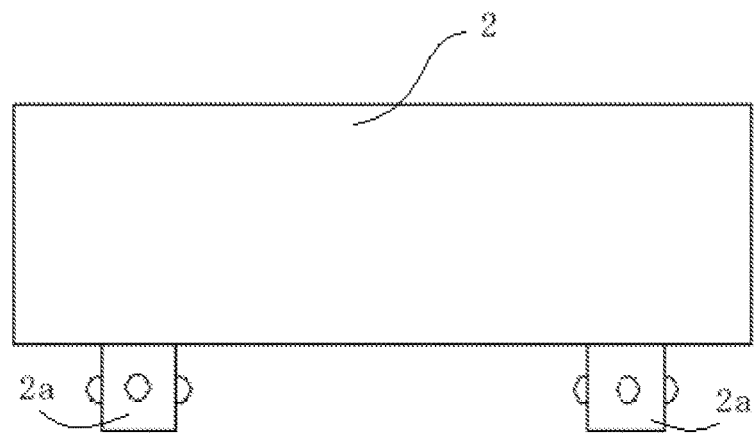

As shown in FIG. 3, the middle layer of the circular table-type sensory device 4 has a large movable ring 12 formed in a completely round shape, a first motor 13 to drive the large movable ring 12, a small movable ring 11 to be moved along an arc passing through a center point of a circle of the large movable ring 12, a second motor 22 to drive the small movable ring 11, a moving arm 14 formed integrally with the small movable ring 11, and a rack 21 formed in an arc shape around a supporting point of the moving arm 14 as a center.

In the large movable ring 12, teeth are formed on an entire inner peripheral surface and a flange 12a is formed on an outer peripheral surface. A lower surface and a side surface of the flange 12a are supported by a plurality of holding members 15 attached to an inner peripheral surface of the body 7 at intervals.

As shown in FIG. 2 and FIG. 3, support rollers 16 are attached to each of the holding members 15 so as to be in contact with the lower surface and the side surface of the flange 12a. The large movable ring 12 is supported by the support rollers 16 at a predetermined position in the circular table-type sensory device 4 so that the large movable ring 12 can be freely rotated.

A stopper ring 18 is covered on an upper surface of the flange 12a and fixed by bolts 17. The large movable ring 12 is fixed by the stopper ring 18 not to be removed from the circular table-type sensory device 4.

The first motor 13 is mounted on a bracket 19 inside the body 7. A pinion 20 is formed on a tip portion of a rotation axis of the first motor so as to be engaged with the teeth formed on the inner peripheral surface of the large movable ring 12.

A watt meter 13a is attached to the first motor 13 to detect power consumption.

The wattmeter 13a is electrically connected to the built-in computer device C by a signal line to transmit the power consumption to the built-in computer device C.

The moving arm 14 and the rack 21 are attached to the large movable ring 12. The rack 21 is formed in an arc shape around the supporting point of the moving arm 14 as a center. The teeth are formed on the inner peripheral surface of the rack 21.

The moving arm 14 has a second motor 22 to drive the moving arm 14 along the inner peripheral surface of the rack 21 and a fourth motor 27 to drive the rod 3a upward and downward.

The second motor 22 is mounted on the upper surface of the moving arm 14. A rotation axis of the second motor 22 penetrates through the moving arm 14. A pinion 23 to be engaged with the teeth of the rack 21 is attached to the tip of the rotation axis.

A wattmeter 22a is attached to the second motor 22 to detect power consumption.

The wattmeter 22a is electrically connected to the built-in computer device C by a signal line to transmit the power consumption to the built-in computer device C.

The fourth motor 27 is mounted on the tip of the moving arm 14. A pinion 28 to be engaged with the teeth of the rod 3a is attached to the tip of the rotation axis of the fourth motor 27.

A wattmeter 27a is attached to the fourth motor 27 to detect power consumption.

The wattmeter 27a is electrically connected to the built-in computer device C by a signal line to transmit the power consumption to the built-in computer device C.

Figure 5:
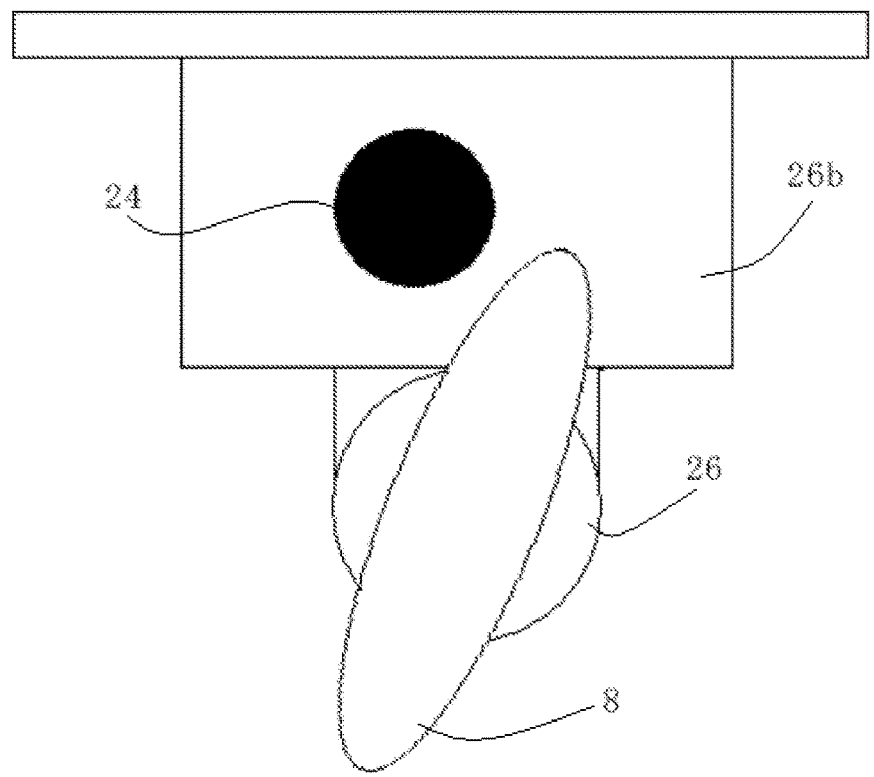
FIG. 5 is a vertical cross-section of an impact device 9 of one embodiment of the present invention.

As the impact device 9, as shown in FIG. 2 and FIG. 5, a motor base 26b is attached to a lower surface of the circular table 3. A spring 25 made of stainless steel is fixed to the motor base 26b. An impact ball 24 made of rubber and formed in an oval spherical shape is attached to an opposite side of the spring 25.

The third motor 26 is fixed to the motor base 26b. An elliptic plate 8 is attached to the tip of a rotation axis of the third motor 26.

A wattmeter 26a is attached to the third motor 26 to detect power consumption.

The wattmeter 26a is electrically connected to the built-in computer device C by a signal line to transmit the power consumption to the built-in computer device C.

In the lower layer of the circular table-type sensory device 4, as shown in FIG. 2, the built-in computer device C is fixed to a bottom portion of the circular table-type sensory device 4.

The display device 6 is a devise to output image and sound on it. The display device 6 outputs image and sound based on the signal transmitted from the video-game device 5.

The video-game device 5 transmits the movement of characters simultaneously to the built-in computer device C and the display device 6. The video-game device 5 is connected to the remote controller R, the built-in computer device C and the display device 6 by signal lines.

The built-in computer device C performs motor control and calculation of the load of the motors.

The motor control is a control to create tactile sense of the movement of the characters corresponding to the content of the video-game in the circular table-type sensory device 4 by rotating the motors 13, 22, 26, 27 while predicting the power consumption.

As shown in FIG. 6, the calculation of the load of the motors is a calculation to quantify the load from the estimated power consumption and the power consumption by receiving the power consumption from the wattmeters 13a, 22a, 27a. The quantified load is converted into the button operation of the remote controller for the video-game and transmitted to the remote controller R.

Next, operations of the present embodiment will be explained. In the present embodiment, as shown in FIG. 1, the player J places the circular table-type sensory device 4 in front of the display device 6 and the player J plays the video-game from the lateral side of the circular table-type sensory device 4 while holding the figurine 1a set to the adapter 2 by hand.

When the built-in computer device C receives the signal of the movement of the game characters from the video-game device 5, by rotating the motors 13, 22, 26, 27, the built-in computer device C creates a simulated movement of the game characters such as the movement forward, backward, right, left, obliquely, upward and downward and the impact by using the circular table-type sensory device 4 and the circular table 3 to which the adapter 2 is fixed.

The player J holds the figurine 1a set to the adapter 2 by hand and bodily feels the tactile sense of the movement of the figurine 1a, which moves with the same motion as the display screen, while watching the movement of the game characters shown in the display screen of the display device 6. At the same time, the player J accelerates or restricts the movement of the figurine 1a while adjusting the force of the player J.

As the impact device 9, as shown in FIG. 2 and FIG. 5, a motor base 26b is attached to a lower surface of the circular table 3. The spring 25 made of stainless steel is fixed to the motor base 26b. The impact ball 24 made of rubber and formed in an oval spherical shape is attached to an opposite side of the spring so as to be vertically moved as if it is bounced.

The third motor 26 is fixed to the motor base 26b. The elliptic plate 8 is attached to the tip of the rotation axis of the third motor 26. The elliptic plate 8 is located at a position to hit the impact ball 24 when the elliptic plate 8 is rotated. When the impact ball 24 is hit by the elliptic plate 8, the impact ball 24 is strongly bounced upward and downward and hit the lower surface of the circular table 3 to apply the impact to the circular table 3.

Furthermore, by rotating the first motor 13, the second motor 22 and the fourth motor 27 simultaneously, the movement of the small movable ring 11 is combined with the rotation movement of the large movable ring 12. Thus, the rod 3a can be moved forward, backward, right, left, obliquely, upward and downward in a circle of the large movable ring 12.

Accordingly, the player J can bodily feel (experience) the tactile sense corresponding to the content of the video-game by using the adapter 2 to which the figurine 1a is set and the circular table 3 formed integrally with the rod 3a.

When the player J operates the tools of the adapter 2 to which the figurine 1a is set and the circular table 3 to which the adapter 2 is fixed, the motors 13, 22, 27 receive the load. The built-in computer device C receives the power consumption from the wattmeters 13a, 22a, 27a. Then, the built-in computer device C calculates and quantifies the load from the estimated power consumption and the power consumption, converts the quantified load into the operation of the button portion of the remote controller for the video-game, and transmits it to the remote controller R as a signal.

In a simulated experience device for video-game, the button portion of the remote controller for the video-game is replaced with the tool and the mechanical device which can create the tactile sense corresponding to the content of the video-game, make the operator bodily feel the created tactile sense, and make the operator give a reaction to the force of the tactile sense felt by the operator. The operator can feel the force of the tactile sense corresponding to the content of the video-game and generate the load to the tool and the mechanical device, as shown in FIG. 6, by operating the tool and the mechanical device while adjusting the force by the human.

When the generated load is quantified as X and converted into the button operation of the remote controller for the video-game, the following relation is always satisfied.

load=X=button operation

Because of the above described formula, a simulated experience device for video-game capable of being operated by the force adjusted by the operator can be achieved. In the present embodiment, the opening of the circular table-type sensory device 4 is covered with a safety cover 29 made of a flexible material. Hence, an injury caused by touching the machine inside the circular table-type sensory device 4 can be prevented.

Although the embodiments of the present invention are explained above, the following variations can be added to the above described embodiments.

The circular table-type sensory device 4 is formed in a cylindrical shape, and the circular table 3 is formed in a circular shape. However, these shapes can be replaced with other shapes.

The mechanical devices, which are the display device 6, the video-game device 5, the remote controller R and the circular table-type sensory device 4, can be integrally formed by combining with each other without being separated from each other. The signal lines connecting all mechanical devices can be either wired or wireless.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A simulated experience device for video-game, wherein
a virtual tactile sense corresponding to a content of a video-game is created by using a tool and a mechanical device and an operator experiences the virtual tactile sense corresponding to the content of the video-game,
a button portion of a remote controller for the video-game is replaced by the tool and the mechanical device for creating the virtual tactile sense corresponding to the content of the video-game so that the operator bodily feels the virtual tactile sense created by the tool and the mechanical device and operates the tool and the mechanical device to generate a load by giving a reaction to the tool and the mechanical device according to the virtual tactile sense felt by the operator while adjusting a force of the operator, the tool and the mechanical device include:
- a safety cover to cover an opening of a circular table-type sensory device;
- a circular table formed integrally with a rod, the circular table being movable freely forward, backward, right, left, obliquely, upward and downward within a range of the opening;
- an adapter fixed to the circular table;
- a figurine set to the adapter;
- an impact device attached to a lower part of the circular table;
- a third motor to serve as a driving force of the impact device;
- a large movable ring having a completely round shape to be rotated along an inner periphery surface of a body;
- a first motor to drive the large movable ring;
- a small movable ring to be moved in the large movable ring along an arc passing through a center point of a circle of the large movable ring;
- a second motor to drive the small movable ring;
- a fourth motor to drive the rod housed in the small movable ring upward and downward; and
- a built-in computer device fixed to a bottom part of the circular table-type sensory device, the built-in computer device performs:
- a first control that calculates an estimated power consumption for driving the first to fourth motors based on a video-game signal received from a video-game device;
- a second control that creates the virtual tactile sense corresponding to the content of the video-game based on the video-game signal by driving the first to fourth motors; and
- a third control that receives from a wattmeter a power consumption of the first, second and fourth motors receiving the load generated when the operator bodily feels the created virtual tactile sense and gives the reaction while adjusting the force of the operator, quantifies the load as an X, converts the X into a button operation of the remote controller for the video-game, gives a numeral "1" to an action of pressing a button and a numeral "0" to an action of not pressing the button or the numeral "0" to the action of pressing the button and the numeral "1" to the action of not pressing the button, and transmits a binary-quantified signal to the remote controller for the video-game for replacing the button portion of the remote controller for the video-game by the tool and the mechanical device for creating the virtual tactile sense corresponding to the content of the video-game, the operator bodily feels the virtual tactile sense corresponding to the content of the video-game created by the tool and the mechanical device, the reaction is given to the tool and the mechanical device while adjusting the force of the operator, and an operation of the video-game is replaced by an operation that the tool and the mechanical device receive the load.

2. The simulated experience device for video-game according to claim 1, wherein the virtual tactile sense corresponding to the content of the video-game is created by using the tool and the mechanical device and the operator experiences the virtual tactile sense corresponding to the content of the video-game, instead of replacing the button portion of the remote controller for the video-game by the tool and the mechanical device for creating the virtual tactile sense corresponding to the content of the video-game, the operation of the video-game is replaced by an operation of giving the reaction to the virtual tactile sense felt by the operator while adjusting the force of the operator when the operator bodily feels the virtual tactile sense created by the tool and the mechanical device corresponding to the content of the video-game, and the operator bodily feels the virtual tactile sense corresponding to the content of the video-game created by the tool and the mechanical device, the reaction is given to the tool and the mechanical device while adjusting the force of the operator, and an operation of the video-game is replaced by an operation that the tool and the mechanical device receive the load.

3. The simulated experience device for video-game according to claim 2, wherein in the operation of giving the reaction to the virtual tactile sense felt by the operator while adjusting the force of the operator, the virtual tactile sense, which is created so as to be corresponding to the content of the video-game, receives the load.

4. The simulated experience device for video-game according to claim 3, wherein the operation of giving the reaction to the virtual tactile sense felt by the operator is combined with a doll play using the figurine.

* * * * *